United States Patent
Lee et al.

(10) Patent No.: US 10,995,212 B2
(45) Date of Patent: May 4, 2021

(54) THERMOPLASTIC POLYETHER ESTER ELASTOMER COMPRISING ANHYDROSUGAR ALCOHOL DERIVATIVE AND METHOD FOR PREPARING SAME

(71) Applicant: SAMYANG CORPORATION, Seoul (KR)

(72) Inventors: Min Sun Lee, Daejeon (KR); Mi Ran Kim, Daejeon (KR); Yun Ju Chang, Daejeon (KR); Jae Kwan Kwon, Sejong (KR); Cheol Han Lee, Geumsan-gun (KR); Young Do Kwon, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 17 days.

(21) Appl. No.: 16/467,876

(22) PCT Filed: Nov. 14, 2017

(86) PCT No.: PCT/KR2017/012872
§ 371 (c)(1),
(2) Date: Jun. 7, 2019

(87) PCT Pub. No.: WO2018/105914
PCT Pub. Date: Jun. 14, 2018

(65) Prior Publication Data
US 2020/0071518 A1    Mar. 5, 2020

(30) Foreign Application Priority Data
Dec. 9, 2016 (KR) .......... 10-2016-0167488
Jul. 4, 2017 (KR) .......... 10-2017-0084637

(51) Int. Cl.
*C08L 67/02* (2006.01)
*C08G 63/137* (2006.01)
*C08G 63/189* (2006.01)
*C08G 63/672* (2006.01)
*C08G 67/00* (2006.01)

(52) U.S. Cl.
CPC .......... *C08L 67/025* (2013.01); *C08G 63/137* (2013.01); *C08G 63/189* (2013.01); *C08G 63/672* (2013.01); *C08G 67/00* (2013.01); *C08L 2203/30* (2013.01); *C08L 2207/04* (2013.01)

(58) Field of Classification Search
CPC .... C08G 63/66; C08G 63/668; C08G 63/672; C08G 67/00; C08G 63/12–189
See application file for complete search history.

(56) References Cited

U.S. PATENT DOCUMENTS

| 3,023,192 | A  | 2/1962  | Shivers, Jr. |
| 4,937,314 | A  | 6/1990  | Greene |
| 6,562,457 | B1 | 5/2003  | Goldfinger et al. |
| 6,608,167 | B1 | 8/2003  | Hayes et al. |
| 6,833,428 | B1 | 12/2004 | Kato |

FOREIGN PATENT DOCUMENTS

| JP | 2004-131701 A    | 4/2004  |
| KR | 10-1999-0085174 A | 12/1999 |
| KR | 10-2002-0027554 A | 4/2002  |
| KR | 10-2004-0062421 A | 7/2004  |

OTHER PUBLICATIONS

International Search Report issued in PCT/KR2017/012872 (PCT/ISA/210), dated Feb. 19, 2018.

*Primary Examiner* — Ana L. Woodward
(74) *Attorney, Agent, or Firm* — Birch, Stewart, Kolasch & Birch, LLP

(57) ABSTRACT

The present invention relates to a thermoplastic polyether ester elastomer (TPEE) having a hard segment and a soft segment and a method for preparing the same and, more specifically, to a thermoplastic polyether ester elastomer and a method for preparing the same, wherein a unit derived from an anhydrosugar alcohol derivative with improved reactivity derived from biomass is contained in the soft segment, and thus through the adjustment of the content of the anhydrosugar alcohol derivative, elastic characteristics and physical characteristics (for example, hardness, etc.), which are important characteristics of an elastomer, can be favorably maintained, the melting point variously required in the molding process of a final product can be easily controlled, a problem of depletion of, especially, petroleum resources as finite resources, can be solved, and environmental friendliness can be improved.

14 Claims, No Drawings

THERMOPLASTIC POLYETHER ESTER ELASTOMER COMPRISING ANHYDROSUGAR ALCOHOL DERIVATIVE AND METHOD FOR PREPARING SAME

TECHNICAL FIELD

The present invention relates to a thermoplastic polyether ester elastomer (TPEE) having a hard segment and a soft segment and a method for preparing the same, and more specifically, to a thermoplastic polyether ester elastomer and a method for preparing the same, wherein a unit derived from an anhydrosugar alcohol derivative with improved reactivity derived from biomass is contained in the soft segment, and thus through the adjustment of the content of the anhydrosugar alcohol derivative, elastic characteristics and physical characteristics (for example, hardness, etc.), which are important characteristics of an elastomer, can be favorably maintained, the melting point variously required in the molding process of a final product can be easily controlled, a problem of depletion of, especially, petroleum resources as finite resources, can be solved, and environmental friendliness can be improved.

BACKGROUND ART

The elastomer has unique elastic properties and is used in many applications such as packaging containers, automobile interior materials, elastic fibers, etc. Particularly, in the case of thermoplastic polyether ester copolymers, their use is increasing due to their wide range of elastic properties. In addition, unlike rubber materials which cannot be recycled, elastomers are easily recycled, and therefore demand for them is greatly increasing.

Thermoplastic elastomers are polymers having both of two different properties—namely, thermoplasticity which can be reformed upon heating and elastomeric properties of the rubber-like elastomer. The form of the thermoplastic elastomer is a kind of block copolymer, which consists of a hard segment block, which can generally exhibit thermoplastic property, and a soft segment block, which can exhibit the elastic properties of the elastomer. Therefore, it exhibits two different properties at the same time.

It is already known that a polyether ester copolymer having a polybutylene terephthalate-based polyester as a hard segment and a polybutylene ether ester as a soft segment exhibits excellent elastic properties, and polyethylene ether esters are also used as soft segments to lower manufacturing costs.

U.S. Pat. No. 3,023,192 discloses hard segment/soft segment copolymerized polyesters and elastomers prepared therefrom. The hard segment/soft segment copolymerized polyester is prepared from (1) a dicarboxylic acid or ester-forming derivative, (2) a polyethylene glycol ether and (3) a dihydroxy compound selected from a bisphenol and a lower aliphatic glycol. Examples of the polyether used as a soft segment together with polyethylene glycol include polypropylene glycol, polytetramethylene glycol, polyhexamethylene glycol, etc., and a polyether having a molecular weight of about 350 to 6,000 is used.

U.S. Pat. No. 4,937,314 discloses a thermoplastic polyether ester elastomer comprising at least 70 parts by weight of a soft segment derived from poly(alkylene oxide) glycol and terephthalic acid. The hard segment constitutes 10 to 30 parts by weight of the elastomer, and the content of the poly(1,3-propylene terephthalate) in the hard segments is 95 to 100 parts by weight. It is disclosed that the molecular weight of the poly(alkylene oxide)glycol is from about 1,500 to about 5,000 and the ratio of carbon to oxygen is from 2 to 4.3.

Thermoplastic elastomers based on those exemplified in the prior art include soft segments mainly composed of polytetramethylene glycol ethers, copolymers of tetrahydrofuran and 3-alkyltetrahydrofuran, polyethylene glycol ethers, polytrimethylene glycol ethers and copolymers thereof. The melting point and physical properties of these copolymers are determined by the molecular weight and composition ratio of the polyalkylene glycol ether used as the soft segment. When a polyalkylene glycol ether having a high molecular weight is used to develop strong physical and elastic properties, it cannot be applied to a manufacturing process requiring a low melting point because of its high melting point. In addition, in the case of using the polyethylene glycol ether as a soft segment, when the content of the soft segment is 20 wt % or more, the thermal stability sharply drops.

Recently, active research on environmentally friendly biomass has attracted attention as a part of efforts to reduce carbon dioxide emissions which are major causes of global warming and replace limited high-cost petroleum resources. The conversion from conventional petroleum-derived plastics to plastics derived from plant materials with a low environmental load is actively sought.

CONTENTS OF THE INVENTION

Problems to be Solved

The present invention is intended to resolve the above-stated problems of the prior arts, and has an object of providing a thermoplastic polyether ester elastomer which can improve the environmental friendliness and can easily control the melting points variously required in the molding process of the final product with maintaining excellent elastic properties and physical properties of the thermoplastic elastomer, and a method for preparing the same.

Technical Means

In order to resolve the above-stated problems, the present invention provides a thermoplastic polyether ester elastomer consisting of a hard segment and a soft segment, wherein the hard segment comprises an aromatic dicarboxylic compound and an aliphatic diol component as polymerized units, the soft segment comprises an aromatic dicarboxylic compound and a glycol component as polymerized units, and the glycol component comprises an anhydrosugar alcohol-alkylene glycol.

In another aspect, the present invention provides a method for preparing a thermoplastic polyether ester elastomer comprising a polycondensation reaction of an aromatic dicarboxylic compound with a polyol, wherein the polyol comprises an aliphatic diol component and a glycol component, and the glycol component comprises an anhydrosugar alcohol-alkylene glycol.

In still another aspect, the present invention provides a molded article comprising the thermoplastic polyether ester elastomer of the present invention.

Effect of the Invention

The thermoplastic polyether ester elastomer (TPEE) according to the present invention consists of a hard segment and a soft segment, wherein an anhydrosugar alcohol-alkylene glycol (an alkylene oxide adduct of anhydrosugar alcohol), which is an anhydrosugar alcohol derivative with improved reactivity derived from biomass, is contained in the soft segment. Thus, by means of the adjustment of the content of the anhydrosugar alcohol derivative, it is possible to easily control melting points variously required in the molding process of the final product with maintaining excellent elastic properties and physical properties (for example, hardness, etc.), which are important properties of the elastomer. In particular, it can solve the problem of depletion of petroleum resources, which are finite resources, and can improve environmental friendliness.

Concrete Mode for Carrying out the Invention

The present invention is explained in more detail below.

The hard segment constituting the thermoplastic polyether ester elastomer of the present invention comprises an aromatic dicarboxylic compound and an aliphatic diol component as polymerized units.

The aromatic dicarboxylic compound may be an aromatic dicarboxylic acid or an aromatic dicarboxylate compound, and more specifically, may be selected from the group consisting of terephthalic acid, isophthalic acid, 1,5-dinaphthalene dicarboxylic acid, 2,6-dinaphthalene dicarboxylic acid, dimethyl terephthalate, dimethyl isophthalate and combinations thereof.

The aliphatic diol component contained as a polymerization unit in the hard segment may be a linear or cyclic aliphatic diol, specifically a linear aliphatic diol having 2 to 8 carbon atoms or a cyclic aliphatic diol having 3 to 8 carbon atoms, and more specifically, selected from the group consisting of ethylene glycol, propylene glycol, 1,4-butanediol, 1,5-pentanediol, 1,6-hexanediol, 1,4-cyclohexanedimethanol and combinations thereof.

The soft segment constituting the thermoplastic polyether ester elastomer of the present invention comprises an aromatic dicarboxylic compound and a glycol component as polymerized units, and the glycol component comprises an anhydrosugar alcohol-alkylene glycol.

As the aromatic dicarboxylic compound contained as a polymerization unit in the soft segment, those described above in the hard segment can be used.

The anhydrosugar alcohol-alkylene glycol is an adduct obtained by reacting an alkylene oxide with a hydroxyl group(s) at both terminals or one terminal (preferably both terminals) of anhydrosugar alcohol.

In one embodiment, the anhydrosugar alcohol may be selected from the group consisting of isosorbide, isomannide, isoidide and combinations thereof, preferably isosorbide.

In one embodiment, the alkylene oxide may be a linear alkylene oxide having 2 to 8 carbon atoms and a branched alkylene oxide having 3 to 8 carbon atoms, and more specifically, ethylene oxide, propylene oxide or a combination thereof.

In one embodiment, the anhydrosugar alcohol-alkylene glycol may be a compound represented by the following Formula 1:

[Formula 1]

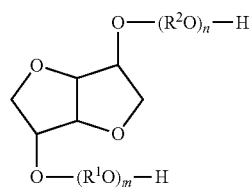

In Formula 1, each of $R^1$ and $R^2$ independently represents a linear alkylene group having 2 to 8 carbon atoms or a branched alkylene group having 3 to 8 carbon atoms, each of m and n independently represents an integer of 0 to 15, and m+n represents an integer of 1 to 30.

More preferably, in Formula 1, each of $R^1$ and $R^2$ independently represents an ethylene group, a propylene group or an isopropylene group, preferably $R^1$ and $R^2$ are the same as each other, each of m and n independently represents an integer of 1 to 14, and m+n represents an integer of 2 to 15.

In one embodiment, the anhydrosugar alcohol-alkylene glycol may be the following isosorbide-propylene glycol, isosorbide-ethylene glycol or mixtures thereof.

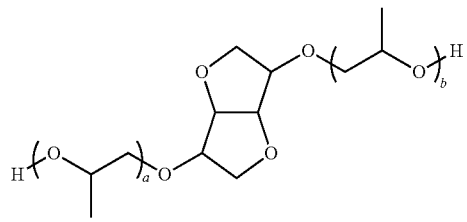

[Isosorbide-propylene glycol]

In the above formula, a+b may be an integer of 1 to 30, and more preferably an integer of 2 to 15.

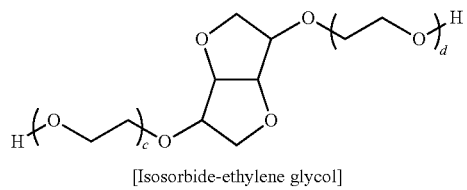

[Isosorbide-ethylene glycol]

In the above formula, c+d may be an integer of 1 to 30, and more preferably an integer of 2 to 15.

In 100 wt % of the thermoplastic polyether ester elastomer (TPEE) of the present invention, the anhydrosugar alcohol-alkylene glycol (for example, the isosorbide-alkylene glycol) may be comprised, for example, in an amount of 1 wt % to 30 wt %, preferably 3 wt % to 29 wt %, more preferably from 3 wt % to 20 wt %, and even more preferably from 3 wt % to 15 wt %. The content of anhydrosugar alcohol-alkylene glycol in the TPEE is preferable in the above-mentioned range in terms of reactivity, mechanical strength and flexibility.

The glycol component comprised as a polymerized unit in the soft segment may further comprise a polyalkylene ether glycol.

The polyalkylene ether glycol may be a poly ($C_2$-$C_8$) alkylene ether glycol, preferably selected from the group consisting of polyethylene ether glycol, polypropylene ether glycol, polytetramethylene ether glycol and combinations thereof, and more preferably polytetramethylene ether glycol.

In 100 wt % of the thermoplastic polyether ester elastomer (TPEE) of the present invention, the soft segment may be comprised, for example, in an amount of from 5 wt % to 75 wt %, more preferably from 30 wt % to 70 wt %. The content of the soft segment in the TPEE is preferable within the above range in terms of blow moldability, mechanical strength and flexibility. If the content of the soft segment in the TPEE is much smaller than the above-mentioned level, it is difficult to expect flexibility because the hardness becomes high. Conversely, if the content of the soft segment in the TPEE is too much, it is difficult to expect high heat resistance.

In another aspect, the present invention provides a method for preparing a thermoplastic polyether ester elastomer comprising a polycondensation reaction of an aromatic dicarboxylic compound with a polyol, wherein the polyol comprises an aliphatic diol component and a glycol component, and the glycol component comprises an anhydrosugar alcohol-alkylene glycol.

The polycondensation reaction may be carried out under reduced pressure, optionally in the presence of a catalyst—for example, under temperature conditions of 210 to 250° C.

The thermoplastic polyether ester elastomer of the present invention is suitable for a molding process such as blowing, extrusion and injection molding, and it is possible to easily control melting points variously required in the molding process of the final product with maintaining excellent elastic properties and physical properties (for example, hardness, etc.), which are important properties of the elastomer.

Therefore, in still another aspect, the present invention provides a molded article comprising the thermoplastic polyether ester elastomer of the present invention.

The present invention is explained in more detail through the following Examples and Comparative Examples. However, the scope of the present invention is not limited thereby in any manner.

EXAMPLES

Preparation of an Anhydrosugar Alcohol-Alkylene Glycol

Preparation Example A1: Preparation of Isosorbide-Ethylene Glycol (5-Mole Ethylene Oxide Adduct of Isosorbide)

73.1 g (0.5 mol) of isosorbide, 110 g (2.5 mol) of ethylene oxide and 0.2 g of sodium hydroxide as a catalyst were placed in a pressurizable reactor equipped with a column having nitrogen gas pipes and a cooling device, a stirrer, a thermometer and a heater, and were gradually warmed up. The mixture was reacted while maintaining the temperature at 120 to 160° C. for 2 to 4 hours to obtain isosorbide-ethylene glycol (5-mole ethylene oxide adduct of isosorbide)—which is a form in which the hydrogen of the hydroxyl groups at both terminals of the isosorbide are substituted with hydroxyethyl groups.

Preparation Example A2: Preparation of Isosorbide-Ethylene Glycol (10-Mole Ethylene Oxide Adduct of Isosorbide)

73.1 g (0.5 mol) of isosorbide, 220 g (5 mol) of ethylene oxide and 0.2 g of sodium hydroxide as a catalyst were placed in a pressurizable reactor equipped with a column having nitrogen gas pipes and a cooling device, a stirrer, a thermometer and a heater, and were gradually warmed up. The mixture was reacted while maintaining the temperature at 120 to 160° C. for 2 to 4 hours to obtain isosorbide-ethylene glycol (10-mole ethylene oxide adduct of isosorbide)—which is a form in which the hydrogen of the hydroxyl groups at both terminals of the isosorbide are substituted with hydroxyethyl groups.

Preparation Example B1: Preparation of Isosorbide-Propylene Glycol (5-Mole Propylene Oxide Adduct of Isosorbide)

73.1 g (0.5 mol) of isosorbide, 145 g (2.5 mol) of propylene oxide and 0.2 g of sodium hydroxide as a catalyst were placed in a pressurizable reactor equipped with a column having nitrogen gas pipes and a cooling device, a stirrer, a thermometer and a heater, and were gradually warmed up. The mixture was reacted while maintaining the temperature at 120 to 160° C. for 2 to 4 hours to obtain isosorbide-propylene glycol (5-mole propylene oxide adduct of isosorbide)—which is a form in which the hydrogen of the hydroxyl groups at both terminals of the isosorbide are substituted with hydroxypropyl groups.

Preparation Example B2: Preparation of Isosorbide-Propylene Glycol (8-Mole Propylene Oxide Adduct of Isosorbide)

73.1 g (0.5 mol) of isosorbide, 232 g (4 mol) of propylene oxide and 0.2 g of sodium hydroxide as a catalyst were placed in a pressurizable reactor equipped with a column having nitrogen gas pipes and a cooling device, a stirrer, a thermometer and a heater, and were gradually warmed up. The mixture was reacted while maintaining the temperature at 120 to 160° C. for 2 to 4 hours to obtain isosorbide-propylene glycol (8-mole propylene oxide adduct of isosorbide)—which is a form in which the hydrogen of the hydroxyl groups at both terminals of the isosorbide are substituted with hydroxypropyl groups.

Preparation of a Thermoplastic Polyether Ester Elastomer

Examples 1 to 10

The reactants having the composition shown in the following Table 1 were placed in a 15 L melt condensation reactor, and 700 ppm of a titanium-based catalyst based on the acid component (dimethyl terephthalate, DMT) was added thereto. Then, the alcohol produced as a by-product was removed while raising the temperature to 210° C., 300 ppm of a titanium-based catalyst was added, and the pressure of the reaction system was gradually reduced to 1 mmHg while raising the temperature to 245° C. to prepare thermoplastic polyether ester elastomers according to Examples 1 to 10.

TABLE 1

| | | | | Example | | | | |
|---|---|---|---|---|---|---|---|---|
| | | | | 1 | 2 | 3 | 4 | 5 |
| Aromatic dicarboxylic compound (DMT, wt %) | | | | 35.3 | 35.8 | 37.2 | 32.3 | 37.2 |
| Polyol | HS | BDO (wt %) | | 16.8 | 19.2 | 20.7 | 16.9 | 20.7 |
| | SS | PTMEG | Molecular weight | 2,000 | 2,000 | 2,000 | 2,000 | 2,000 |
| | | | Content (wt %) | 36.1 | 37.5 | 38.8 | 37.9 | 38.8 |

TABLE 1-continued

|  |  |  |  |  |  |  |  |  |
|---|---|---|---|---|---|---|---|---|
|  | ISB-EO 5 mole | Molecular weight | 365.47 | 365.47 |  |  |  |
|  |  | Content (wt %) | 11.8 | 7.5 |  |  |  |
|  | ISB-EO 10 mole | Molecular weight |  |  | 578.05 |  |  |
|  |  | Content (wt %) |  |  | 3.3 |  |  |
|  | ISB-PO 5 mole | Molecular weight |  |  |  |  |  |
|  |  | Content (wt %) |  |  |  |  |  |
|  | ISB-PO 8 mole | Molecular weight |  |  |  | 618.52 | 618.52 |
|  |  | Content (wt %) |  |  |  | 12.9 | 3.3 |
| Properties of elastomer | eco-friendly monomer (wt %) |  | 4.6 | 2.9 | 0.8 | 3.1 | 0.8 |
|  | Intrinsic viscosity (IV) |  | 1.157 | 1.178 | 1.152 | 1.259 | 1.264 |
|  | Melting point (° C.) |  | 162.69 | 183.54 | 185.95 | 172.53 | 191.98 |
|  | Hardness |  | 36 | 38 | 37 | 36 | 40 |

|  |  |  |  | Example | | | | |
|---|---|---|---|---|---|---|---|---|
|  |  |  |  | 6 | 7 | 8 | 9 | 10 |
| Aromatic dicarboxylic compound (DMT, wt %) |  |  |  | 39.0 | 36.0 | 37.0 | 35.4 | 36.3 |
| Polyol | HS | BDO (wt %) |  | 16.3 | 19.0 | 18.0 | 19.2 | 18.6 |
|  | SS | PTMEG | Molecular weight | 2,000 | 2,000 | 2,000 | 2,000 | 2,000 |
|  |  |  | Content (wt %) | 16.0 | 32.0 | 16.0 | 39.1 | 31.8 |
|  |  | ISB-EO 5 mole | Molecular weight | 365.47 |  |  |  |  |
|  |  |  | Content (wt %) | 28.7 |  |  |  |  |
|  |  | ISB-EO 10 mole | Molecular weight |  | 578.05 | 578.05 |  |  |
|  |  |  | Content (wt %) |  | 13.0 | 29.0 |  |  |
|  |  | ISB-PO 5 mole | Molecular weight |  |  |  | 432.37 | 432.37 |
|  |  |  | Content (wt %) |  |  |  | 6.3 | 13.3 |
|  |  | ISB-PO 8 mole | Molecular weight |  |  |  |  |  |
|  |  |  | Content (wt %) |  |  |  |  |  |
| Properties of elastomer | eco-friendly monomer (wt %) |  |  | 13.8 | 4.0 | 8.7 | 2.7 | 5.3 |
|  | Intrinsic viscosity (IV) |  |  | 1.191 | 1.365 | 1.161 | 1.052 | 1.170 |
|  | Melting point (° C.) |  |  | 132 | 175 | 151 | 177 | 183 |
|  | Hardness |  |  | 35 | 41 | 36 | 40 | 37 |

HS: hard segment
SS: soft segment
BDO: 1,4-butanediol
PTMEG: polytetramethylene ether glycol
ISB-EO 5 mole: isosorbide-ethylene glycol (5-mole ethylene oxide adduct of isosorbide)
ISB-EO 10 mole: isosorbide-ethylene glycol (10-mole ethylene oxide adduct of isosorbide)
ISB-PO 5 mole: isosorbide-propylene glycol (5-mole propylene oxide adduct of isosorbide)
ISB-PO 8 mole: isosorbide-propylene glycol (8-mole propylene oxide adduct of isosorbide)

Comparative Examples 1 to 4

The reactants having the composition shown in the following Table 2 were placed in a 15 L melt condensation reactor, and 700 ppm of a titanium-based catalyst based on the acid component (dimethyl terephthalate, DMT) was added thereto. Then, the alcohol produced as a by-product was removed while raising the temperature to 210° C., 300 ppm of a titanium-based catalyst was added, and the pressure of the reaction system was gradually reduced to 1 mmHg while raising the temperature to 245° C. to prepare thermoplastic polyether ester elastomers according to Comparative Examples 1 to 4.

comprise an anhydrosugar alcohol-alkylene glycol) not according to the present invention, the physical properties such as hardness, etc. were remarkably deteriorated by variously controlling the melting point of the elastomer. And in the case of Comparative Example 4 not according to the present invention (TPEE comprising an anhydrosugar alcohol-alkylene glycol in a range exceeding 30 wt %), it can be seen that the intrinsic viscosity was remarkably poor (that is, the degree of polymerization of TPEE was significantly reduced) by controlling the melting point of the elastomer.

The properties of the thermoplastic elastomers prepared in the above Examples and Comparative Examples were measured as follows.

TABLE 2

|  |  |  |  | Comparative Example | | | |
|---|---|---|---|---|---|---|---|
|  |  |  |  | 1 | 2 | 3 | 4 |
| Aromatic dicarboxylic compound (DMT, wt %) | | | | 34.5 | 29.8 | 27.6 | 38.0 |
| Polyol | HS | | BDO (wt %) | 19.3 | 20.7 | 16.4 | 17.3 |
|  | SS | PTMEG | Molecular weight | 2,000 | 2,000 | 2,000 | 2,000 |
|  |  |  | Content (wt %) | 46.2 | 49.5 | 56.0 | 0 |
|  |  | ISB-EO 5 mole | Molecular weight | | | | |
|  |  |  | Content (wt %) | | | | |
|  |  | ISB-EO 10 mole | Molecular weight | | | | |
|  |  |  | Content (wt %) | | | | |
|  |  | ISB-PO 5 mole | Molecular weight | | | | |
|  |  |  | Content (wt %) | | | | |
|  |  | ISB-PO 8 mole | Molecular weight | | | | 618.52 |
|  |  |  | Content (wt %) | | | | 44.7 |
| Properties of elastomer | | | eco-friendly monomer (wt %) | 0 | 0 | 0 | 18.3 |
|  |  |  | Intrinsic viscosity (IV) | 1.322 | 1.289 | 1.255 | 0.425 |
|  |  |  | Melting point (° C.) | 198.21 | 190 | 178 | 126 |
|  |  |  | Hardness | 40 | 35 | 30 | 35 |

HS: hard segment
SS: soft segment
BDO: 1,4-butanediol
PTMEG: polytetramethylene ether glycol
ISB-EO 5 mole: isosorbide-ethylene glycol (5-mole ethylene oxide adduct of isosorbide)
ISB-EO 10 mole: isosorbide-ethylene glycol (10-mole ethylene oxide adduct of isosorbide)
ISB-PO 5 mole: isosorbide-propylene glycol (5-mole propylene oxide adduct of isosorbide)
ISB-PO 8 mole: isosorbide-propylene glycol (8-mole propylene oxide adduct of isosorbide)

As can be seen from the results of Tables 1 and 2 above, the thermoplastic polyether ester elastomers of Examples 1 to 10 according to the present invention (TPEE containing an anhydrosugar alcohol-alkylene glycol within the range of 1 to 30 wt %) show that as the content of the anhydrosugar alcohol-alkylene glycol (isosorbide-alkylene glycol) increases, physical properties such as hardness remain at the same level, while improving the environmental friendliness and easily controlling the melting point of the elastomer.

That is, in the case of Examples 1 to 10 according to the present invention, the viscosity, elastic properties and physical properties (for example, hardness, etc.), which are important properties of the elastomer, were maintained at the same level, the environmental friendliness was improved, and melting points variously required in the molding process of the final product were easily controlled. However, in the case of Comparative Examples 1 to 3 (TPEE which does not (1) Environmental (eco-) friendliness (wt %): The weight % of an anhydrosugar alcohol (isosorbide) as an environmentally friendly monomer was measured based on the total weight of the polyether ester elastomer.

(2) Intrinsic viscosity (IV): A polyether ester elastomer was dissolved in phenol/tetrachloroethane (weight ratio 50/50) to prepare a 0.5 wt % solution, and then intrinsic viscosity was measured at 35° C. with a Ubbelohde viscometer.

(3) Melting point: Using a thermal differential scanning calorimeter (DSC), the temperature was raised at a heating rate of 10° C. per minute and cooled down. Then, the temperature was raised again, and the melting point was measured.

(4) Hardness: Hardness was measured with Handpi's Showa D durometer.

The invention claimed is:

1. A thermoplastic polyether ester elastomer consisting of a hard segment and a soft segment,
wherein the hard segment comprises an aromatic dicarboxylic compound and an aliphatic diol component as polymerized units,
the soft segment comprises an aromatic dicarboxylic compound and a glycol component as polymerized units,
the glycol component comprises an anhydrosugar alcohol-alkylene glycol,
the anhydrosugar alcohol-alkylene glycol is an adduct obtained by reacting an alkylene oxide with a hydroxyl group(s) at both terminals or one terminal of anhydrosugar alcohol, and
the content of anhydrosugar alcohol-alkylene glycol in 100% by weight of the thermoplastic polyether ester elastomer is 3.3% by weight to 29% by weight.

2. The thermoplastic polyether ester elastomer according to claim 1, wherein the aromatic dicarboxylic compound is selected from the group consisting of terephthalic acid, isophthalic acid, 1,5-dinaphthalene dicarboxylic acid, 2,6-dinaphthalene dicarboxylic acid, dimethyl terephthalate, dimethyl isophthalate and combinations thereof.

3. The thermoplastic polyether ester elastomer according to claim 1, wherein the aliphatic diol component is a linear aliphatic diol having 2 to 8 carbon atoms or a cyclic aliphatic diol having 3 to 8 carbon atoms.

4. The thermoplastic polyether ester elastomer according to claim 1, wherein the aliphatic diol component is selected from the group consisting of ethylene glycol, propylene glycol, 1,4-butanediol, 1,5-pentanediol, 1,6-hexanediol, 1,4-cyclohexanedimethanol and combinations thereof.

5. The thermoplastic polyether ester elastomer according to claim 1, wherein the anhydrosugar alcohol is selected from the group consisting of isosorbide, isomannide, isoidide and combinations thereof.

6. The thermoplastic polyether ester elastomer according to claim 1, wherein the alkylene oxide is a linear alkylene oxide having 2 to 8 carbon atoms and a branched alkylene oxide having 3 to 8 carbon atoms.

7. The thermoplastic polyether ester elastomer according to claim 1, wherein the anhydrosugar alcohol is isosorbide and the alkylene oxide is ethylene oxide, propylene oxide or a combination thereof.

8. The thermoplastic polyether ester elastomer according to claim 1, wherein the anhydrosugar alcohol-alkylene glycol is a compound represented by the following Formula 1:

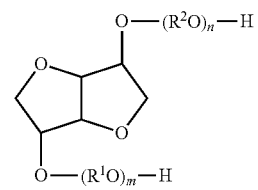

[Formula 1]

In Formula 1,
each of $R^1$ and $R^2$ independently represents a linear alkylene group having 2 to 8 carbon atoms or a branched alkylene group having 3 to 8 carbon atoms,
each of m and n independently represents an integer of 0 to 15, and
m+n represents an integer of 1 to 30.

9. The thermoplastic polyether ester elastomer according to claim 8, wherein each of $R^1$ and $R^2$ independently represents an ethylene group, a propylene group or an isopropylene group, each of m and n independently represents an integer of 1 to 14, and m+n represents an integer of 2 to 15.

10. The thermoplastic polyether ester elastomer according to claim 1, wherein the glycol component comprised as the polymerized unit in the soft segment further comprises a polyalkylene ether glycol.

11. The thermoplastic polyether ester elastomer according to claim 10, wherein the polyalkylene ether glycol is selected from the group consisting of polyethylene ether glycol, polypropylene ether glycol, polytetramethylene ether glycol and combinations thereof.

12. The thermoplastic polyether ester elastomer according to claim 1, wherein the content of the soft segment in 100% by weight of the thermoplastic polyether ester elastomer is 5% by weight to 75% by weight.

13. A molded article comprising the thermoplastic polyether ester elastomer according to claim 1.

14. A method for preparing a thermoplastic polyether ester elastomer comprising a polycondensation reaction of an aromatic dicarboxylic compound with a polyol,
wherein the polyol comprises an aliphatic diol component and a glycol component, and
the glycol component comprises an anhydrosugar alcohol-alkylene glycol,
the anhydrosugar alcohol-alkylene glycol is an adduct obtained by reacting an alkylene oxide with a hydroxyl group(s) at both terminals or one terminal of anhydrosugar alcohol, and
the content of anhydrosugar alcohol-alkylene glycol in 100% by weight of the thermoplastic polyether ester elastomer is 3.3% by weight to 29% by weight.

* * * * *